March 11, 1952 T. B. ROYAL 2,588,883

REVERSING MECHANISM

Filed Sept. 15, 1950

INVENTOR
*Thomas B. Royal*

BY *Mason, Fenwick & Lawrence*

ATTORNEYS

Patented Mar. 11, 1952

2,588,883

UNITED STATES PATENT OFFICE 2,588,883

REVERSING MECHANISM

Thomas B. Royal, Homestead, Fla.

Application September 15, 1950, Serial No. 185,056

2 Claims. (Cl. 74—205)

This invention relates to reversing mechanisms, and more particularly to such mechanisms which do not depend upon gearing for their operation.

There long has been a need for a reversing mechanism which is efficient and quick in operation, and, at the same time, inexpensive to manufacture. Gears are costly, and become noisy with continued use. They are difficult to engage and disengage at high speeds, and it is practically impossible to reverse a shaft motion by means of gearing unless a clutch is employed to break the connection between the gearing and the shaft. Otherwise, there is great danger that the gears, if brought into engagement at all, will be stripped. Nevertheless, it is frequently desirable to suddenly reverse the direction of rotation of a shaft without waiting for the shaft speed to be reduced, and where no clutch is employed to couple the reversing mechanism to the shaft.

It is the object of the present invention to provide reversing mechanism which does not employ gears to effect the reverse movement of the shafting, and which may be moved from one position to another by a single continuous movement of the operating lever without pause in the neutral position.

It is a further object of the invention to provide such mechanism which may be thrown to reverse position at any operating speed of the shafting.

The invention further contemplates mechanism which will function as a clutch to couple and uncouple the driving and driven shafts of the machine with which it is used.

Another object is to provide mechanism which is completely adjustable to take up for wear or to align the various parts to ensure even and efficient operation.

Other objects will become apparent from the following description of one practical embodiment of the invention when taken in conjunction with the drawings which accompany, and form a part of, this specification.

Figure 1:
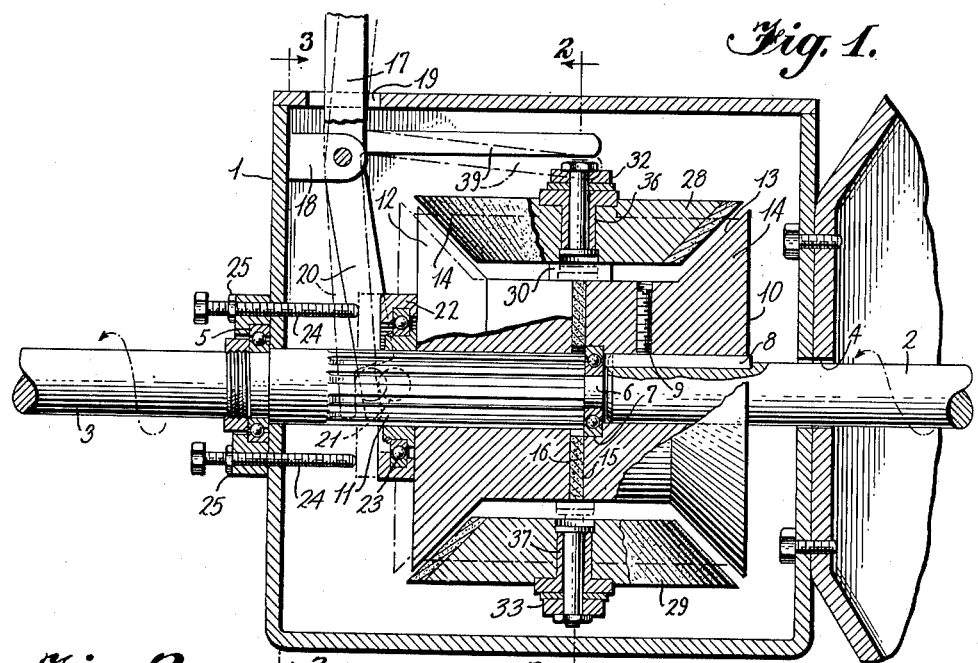
Figure 1 is a vertical section through a reversing mechanism constructed in accordance with the present invention.
Figures 2, 3:
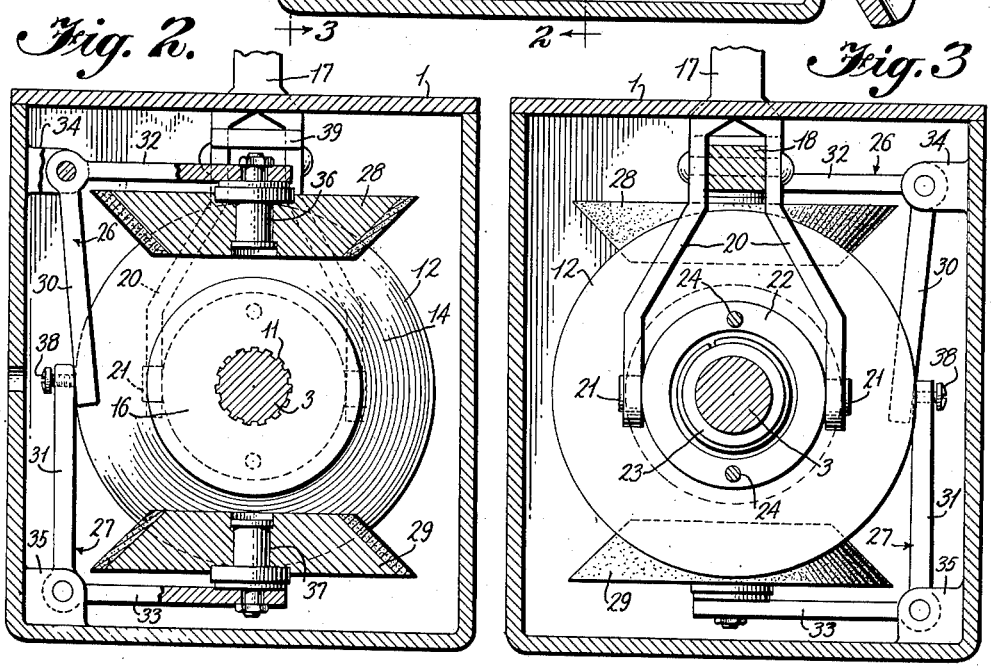
Figure 2 is a vertical transverse section taken on the line 2—2 of Figure 1; and, Figure 3 is a vertical transverse section taken on the line 3—3 of Figure 1.

Referring to the drawings in detail, the reversing mechanism is enclosed within a housing generally indicated at 1. The ends of the driving shaft 2 and the driven shaft 3 are journaled in axial alignment in opposite sides of the housing 1, as at 4 and 5, and the two shafts meet near the center of the housing, the driven shaft 3 having reduced coaxial pilot shaft 6 projecting from its end to rotate within a thrust bearing within a socket 7 adjacent the end of the driving shaft 2.

Fixedly mounted upon the driving shaft 2, by means of a key 8 and a set screw 9, is a cone 10. Slidably mounted upon a splined portion 11 of the driven shaft 3 is a similar cone 12. Both cones, of course, rotate with their respective shafts. Both cones have their beveled sides 13 and 14 covered with friction material, as are their opposed faces 15 and 16. Cone 12 is moved toward and away from cone 10 in order to engage and disengage their faces 15 and 16 by means of an operating handle 17. The handle is pivotally mounted upon ears 18 which project inwardly from the side wall of the housing. The upper end of the handle projects upwardly through a slot 19 in the top of the housing to a position which will be convenient to the operator. The portion of the lever within the housing is bifurcated, as at 20, and extends downwardly to straddle the driven shaft 3. The lower ends of the bifurcated member bear against pins 21 which project laterally from the outer member 22 of a thrust bearing 23 carried upon the rear face of the sliding cone 12. The inner member of the bearing is fixed to the cone, and rotates with it, and the outer member 22 may remain stationary in contact with the operating lever.

Outward sliding movement of cone 12 is limited by means of stops positioned in the side walls of the casing. These may conveniently take the form of screws 24 threaded through the housing wall. Lock nuts 25 are provided for holding the screws in predetermined adjustment.

Mounted upon bell cranks 26 and 27 for movement in directions perpendicular to the axis of the driving and driven shafts are small reversing cones 28 and 29. These cones also have their beveled faces covered with friction material. Bell cranks 26 and 27 each have vertical arms, 30 and 31, and horizontal arms, 32 and 33. Bell crank 26 is pivoted to ears 34 projecting from the housing, and bell crank 27 to similar ears 35. Cones 28 and 29 are journaled upon oil-less bearings 36 and 37 which are attached to the respective horizontal arms 32 and 33 of the cranks 28 and 29. The vertical arms 30 and 31 of cranks 28 and 29 overlap, and arm 31 is provided with an adjusting screw 38 which bears against the adjacent arm 30. By turning the screw 38, the relative positions of the cones 28 and 29 with respect to the axis of the driving and driven shafts may be changed to equalize the pressures of these cones on the cones 10 and 12 as will be explained. Movement is imparted to the bell cranks by an arm 39 which extends horizontally from lever 17.

In operation, handle 17 is moved to the left as viewed in Figure 1, when it is desired to couple the driving and driven shafts for direct, forward movement. This will cause the lower bifurcated portion of the handle to bear against the pins 21 on the outer member 22 of the thrust bearing 23 and move the cone 12 forward until the face 16 of cone 12 is in contact with face 15 of cone 10. The friction material on the faces 15 and 16 will cause cone 10 to drive cone 12 in the direction, and at the speed of cone 10.

When it is desired to reverse the direction of the driven shaft, handle 17 is moved in the opposite direction, or to the right as viewed in Figure 1. This will permit cone 12 to slide back on the splines 11 on shaft 3 uncoupling the two shafts. Continued movement of the handle will cause arm 39 to contact the top of the horizontal arm 32 of bell crank 26 and rock the bell crank about its pivotal connection and move the cone 28 inwardly into contact with the beveled faces of the cones 10 and 12. This rocking movement of bell crank 26 will cause its vertical arm 30 to strike the end of the adjusting screw 38 and so move bell crank 27 about its pivot. This will move cone 29 into contact with cones 10 and 12. The drive will then be through cone 10, cones 28 and 29, and cone 12 to the driven shaft 3, and the direction of rotation of the driven shaft will be reversed to that of the drive shaft.

It will be noted that the journals for cones 28 and 29 are centrally positioned with respect to the cones 10 and 12 when cone 12 is moved to its outward position. This will ensure the proper seating of the cones 28 and 29 upon cones 10 and 12. If there is any divergence from this setting, the stop screws 24 may be adjusted to correct it. If the cones 28 and 29 do not seat upon the cones 10 and 12 fully and simultaneously, the screw 38 may be adjusted until the movement of the cones is equalized. These adjustments may be made to compensate for wear of the friction material on the various cones.

This type of reversing mechanism will be absolutely silent in operation and may be shifted from forward to reverse immediately at any speed of the shafts. The mechanism may serve also as a clutch by shifting the handle to a position where none of the cones will be in contact.

While in the above, one practical embodiment has been disclosed, it will be understood that the form shown is merely by way of illustration of the principles of the invention, and that these principles may take other embodiments within the spirit of the invention as defined by the appended claims.

What is claimed is:

1. In reversing mechanism, a driving shaft and a driven shaft, a friction cone fixed upon one of said shafts, a friction cone slidably mounted upon the other of said shafts, said cones having matching vertical faces, a pivoted operating lever for moving said slidable cone into and out of facial engagement with said fixed cone, a pair of bell cranks pivotally mounted and each having a vertical arm and a horizontal arm, the vertical arms lying in the same plane and overlapping, a friction cone rotatably carried by the horizontal arm of each bell crank with their axes perpendicular to the axes of said driving and driven shafts, and an arm projecting from said operating lever to contact the horizontal arm of one of said bell cranks, whereby movement of said operating lever will cause sliding movement of said slidable cone and rocking movement of said bell cranks to move said perpendicularly mounted cones into and out of engagement with said slidable and fixed cones.

2. In reversing mechanism as claimed in claim 1, adjustable means to limit the outward movement of said slidable cone, and means carried by the overlapping portion of one of said vertical bell crank arms to adjust the relative positions of said bell cranks.

THOMAS B. ROYAL.

REFERENCES CITED

The following references are of record in the file of this patent:

UNITED STATES PATENTS

| Number | Name | Date |
|---|---|---|
| 1,006,638 | English | Oct. 24, 1911 |
| 2,451,621 | Houston | Oct. 19, 1948 |
| 2,451,756 | Lloyd | Oct. 19, 1948 |

FOREIGN PATENTS

| Number | Country | Date |
|---|---|---|
| 505,880 | Germany | Aug. 27, 1930 |